United States Patent [19]

Laliberte et al.

[11] 4,364,878
[45] Dec. 21, 1982

[54] METHOD FOR MOLDING OPHTHALMIC LENSES

[75] Inventors: Albert J. Laliberte, South Woodstock, Conn.; Joseph L. Jerominek, Dudley, Mass.

[73] Assignee: Omnitech Inc., Southbridge, Mass.

[21] Appl. No.: 123,518

[22] Filed: Feb. 22, 1980

Related U.S. Application Data

[63] Continuation of Ser. No. 932,442, Aug. 10, 1978, abandoned.

[51] Int. Cl.³ .............................................. B29D 11/00
[52] U.S. Cl. ............................... 264/2.2; 264/327; 264/328.7; 425/808
[58] Field of Search .................. 264/1, 327, 2.2, 2.3, 264/328.7; 425/808; 249/80, 82, 111

[56] References Cited

U.S. PATENT DOCUMENTS

| | | | |
|---|---|---|---|
| 2,292,917 | 8/1942 | Williams | 264/1 |
| 2,302,918 | 11/1942 | Smith | 264/1 |
| 2,333,131 | 11/1943 | Tillyer et al. | 264/1 |
| 2,479,935 | 8/1949 | Johnson | 264/1 |
| 3,227,507 | 1/1966 | Feinbloom | 264/1 |
| 3,240,854 | 3/1966 | Ewer | 264/2.2 |
| 3,299,475 | 1/1967 | Carlson et al. | |
| 3,390,433 | 7/1968 | Barnett et al. | |
| 3,460,928 | 8/1969 | Cooko | 264/2.2 |
| 3,821,333 | 6/1974 | Goodmin et al. | 264/2.2 |
| 3,931,373 | 1/1976 | Beattie | 264/2.3 |
| 3,938,775 | 2/1976 | Sarofeen | 264/2.2 |
| 4,008,031 | 2/1977 | Weber | 264/1 |
| 4,095,772 | 6/1978 | Weber | 264/2.2 |
| 4,121,896 | 10/1978 | Shepherd | 264/2.2 |
| 4,190,621 | 2/1980 | Gresher | 425/808 |

FOREIGN PATENT DOCUMENTS 1182130  2/1970  United Kingdom.

Primary Examiner—James B. Lowe
Attorney, Agent, or Firm—Shenier & O'Connor

[57] ABSTRACT

A method of and apparatus for molding precisely shaped articles and particularly high minus precision lenses in which a charge of synthetic resin approximating the mass of the finished article is injected under relatively low pressure into a space, having a volume greater than that of the finished article, between optically finished, heated, relatively movable mold inserts. After injection the inserts are moved toward each other under pressure and controlling the cooling of the mass while under pressure to provide uniformly timed solidification of all parts of the mass thus to form the article without the necessity of either high injection pressure or overflow from the mold cavity.

10 Claims, 3 Drawing Figures

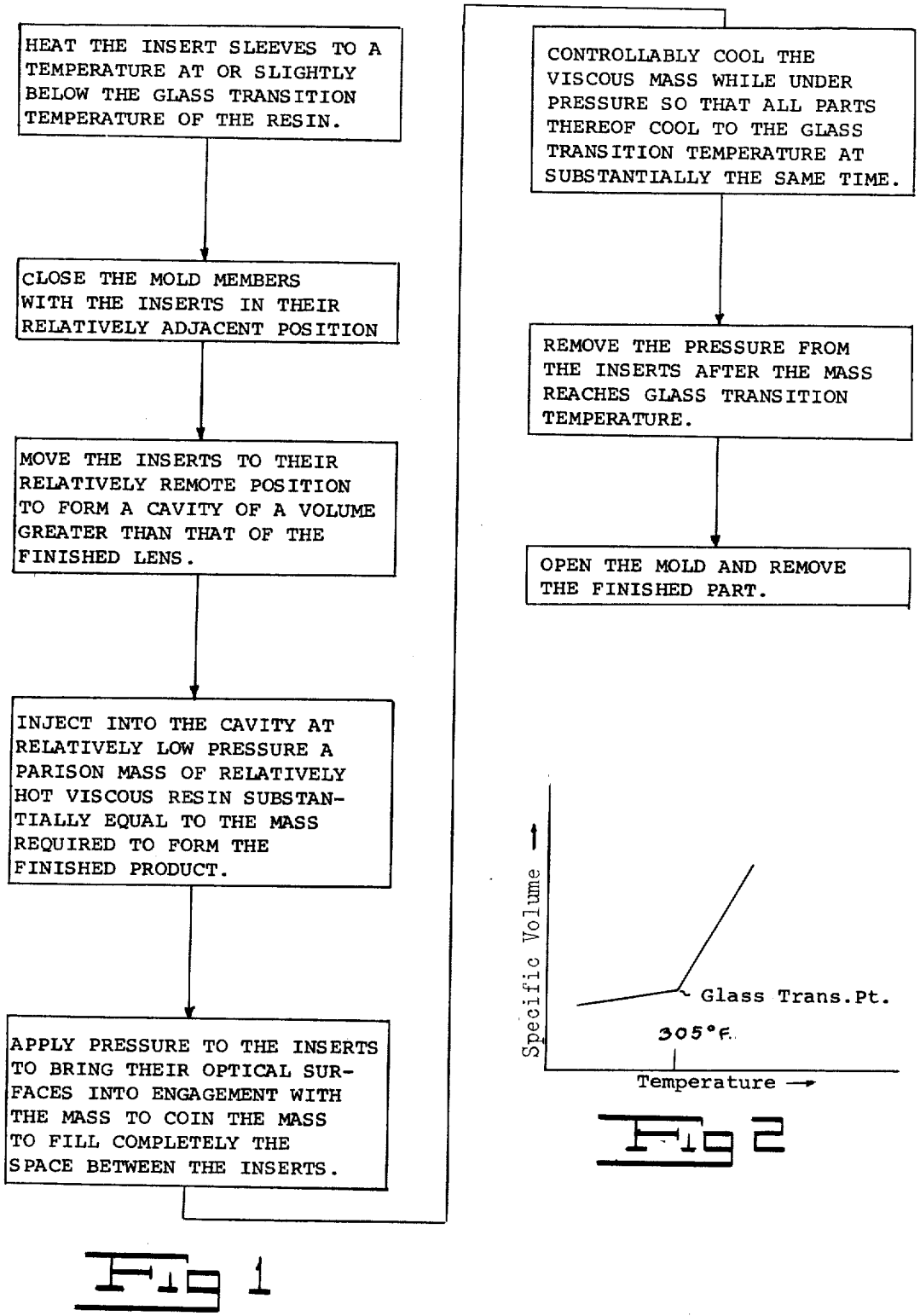

METHOD FOR MOLDING OPHTHALMIC LENSES

This is a continuation of application Ser. No. 932,442, filed Aug. 10, 1978 now abandoned.

BACKGROUND OF THE INVENTION

Our invention relates to an apparatus and a method for molding precisely shaped articles such as ophthalmic lenses from synthetic resin.

Articles such as ophthalmic lenses must be formed as a bubble free body having accurately contoured optically smooth outer surfaces. In the interest of safety and cost reduction, it is desirable that such lenses be formed from a synthetic resin to provide a lens having the required ophthalmic properties and which is substantially unbreakable, which weighs less and which will withstand wear and abuse at least to the degree which a glass lens will stand wear and abuse. While other synthetic resins may be suitable for the formation of such lenses, we have found that polycarbonate resins fulfill the requirements for a synthetic resin lens outlined above.

While it is desirable that ophthalmic lenses be molded from a synthetic resin such as a polycarbonate, the achievement of this result involves a number of problems. Upon being heated to a point at which it melts polycarbonate expands at a constant rate until it reaches a "glass transition" temperature. During this time, the molecules are absorbing energy yet neither the distance between the molecules, nor the energy level attained by the molecular particles is sufficient to allow for intermovement or change in physical state of the material. When the polycarbonate reaches its "glass transition" temperature, it attains a physical state in which the energy absorbed by the molecules is sufficient to allow movement within the molecular lattice. At this point, softening occurs and the material enters a viscous state. As the material is further heated, its density decreases at a sharply increased rate. The voids in the molecular lattice become greater and the molecules, activated by the elevated temperature to a higher energy level, move about more freely. Hence, the material with increase in temperature from the "glass transition" point will exhibit less and less viscosity until at about 500° F. it is a relatively fluid somewhat viscous mass. Owing to the fact that polycarbonate is amorphous, it does not exhibit the characteristic of a sharp melting point and fluidity at the same temperature with heat of fusion required to melt and the removal of this heat of fusion to cause solidification at one temperature. Stated otherwise, there is some hysteresis in the process of heating up polycarbonate to a point at which it melts and then reducing its temperature so that it resolidifies.

A plot of relationship between temperature and specific volume of polycarbonate shows that above the "glass transition" point of about 305° F., expansion with increased heat or contraction by the removal of heat occurs at a greatly accelerated rate than at temperatures below 305° F. Shrinkage resulting from cooling in this zone occurs in the viscous state, is totally random in nature because molecules are free to move wherever they will in the molecular lattice and is of greater magnitude than in the zone below the glass transition point. Shrinkage in the zone below the glass transition point is linear and at a lower rate than in the zone above the glass transition point. In this zone, the molecules are locked into a rigid lattice structure and shrinkage behaves in the same manner as for any solid material.

In conventional injection molding practice, parts are so designed that part thickness differentials are kept to a minimum to avoid "sinks" resulting from the solidification of thinner portions before the solidification of thicker portions. In the design of lenses the only permissible criteria is perfection of curvature and yet "sinks" due to thickness differential must be avoided although thickness differential is appreciable in a majority of lenses.

Having the foregoing in mind, it will readily be appreciated that in the molding of ophthalmic lenses from a synthetic resin such as polycarbonate regardless of thickness differential, the material placed in the mold must attain the "glass transition" temperature evenly so as to minimize localized shrinkage and maintain "distortion" within acceptable limits.

Another problem which exists in the molding of ophthalmic lenses from synthetic resin occurs in the case of "high minus" lenses. In the prior art, as the material is injected into the mold at one location around the periphery of the finished lens, it tends to flow first toward the center and then down and around the mold sides toward a diametrically opposite location at which the material meets itself along a line. The result of this action is the formation of a "weld line" at the location at which the material being injected meets itself.

In another method resin under high pressure is injected into the space between dies mounted on powerful presses so that excess plastic is forced into an overflow chamber. This method requires huge pressures, since it does not provide for properly controlled cooling to prevent jamming by prematurely solidified portions of the injected plastic. The control of thickness of the resultant lens is made difficult by the overflow. The pressing operation has to be controlled to prevent overflow motion from causing strain within the plastic as it is on the verge of setting. The overflow plastic must be removed from the finished optical article. In addition to the foregoing, no one has yet produced high minus lenses without weld lines.

SUMMARY OF THE INVENTION

One object of our invention is to provide an apparatus and a method for molding articles of high precision and quality, such as ophthalmic lenses, from synthetic resins.

Another object of our invention is to provide an apparatus and a method for molding ophthalmic lenses from thermoplastic resins such as polycarbonate.

Yet another object of our invention is to provide an apparatus and method for molding ophthalmic lenses which do not require overflow of material from the mold cavity in the course of the injection step.

A still further object of our invention is to provide a method and apparatus for molding ophthalmic lenses without requiring high injection pressures.

Still another object of our invention is to provide a method and apparatus for molding high minus lenses without forming weld lines.

Other and further objects of our invention will appear from the following description.

In general, our invention contemplates a method of and apparatus for molding ophthalmic lenses, out of synthetic resin in which a charge of synthetic resin approximately the mass of the finished article is injected under relatively low pressure into a space, having a volume greater than that of the finished article, between optically finished, heated relatively movable mold inserts. After injection the inserts are moved relative to each other so as to compress the mass of synthetic resin to cause it to fill the mold cavity and to assume the shape thereof. The mold and the inserts draw heat away from the molten material so as to cause it to cool, shrink and ultimately solidify. As the viscous mass cools to the glass transition temperature and shrinks, pressure is continuously applied to the mass by hydraulic means acting on the inserts. After the mass has cooled down to the glass transition point the further pressure is unnecessary. The final thickness of the article, once the injected material has completely solidified, is accurately determined by the mass of the material which was initially injected.

As the mass cools, heat is withdrawn in such a manner that all parts of the mass reach the glass transition point at substantially the same time, so that the molding surface evenly compresses all of the unsolidified portions as that mass cools to solidification.

BRIEF DESCRIPTION OF THE DRAWINGS

In the accompanying drawings to which reference is made in the instant specification and in which like reference characters are used to indicate like parts in the various views:

FIG. 1 is a flow chart showing the process steps performed in practicing our invention.

FIG. 2 is a graph of the specific volume of polycarbonate resin as a function of temperature.

DETAILED DESCRIPTION OF THE PREFERRED EMBODIMENT

Figure 3:
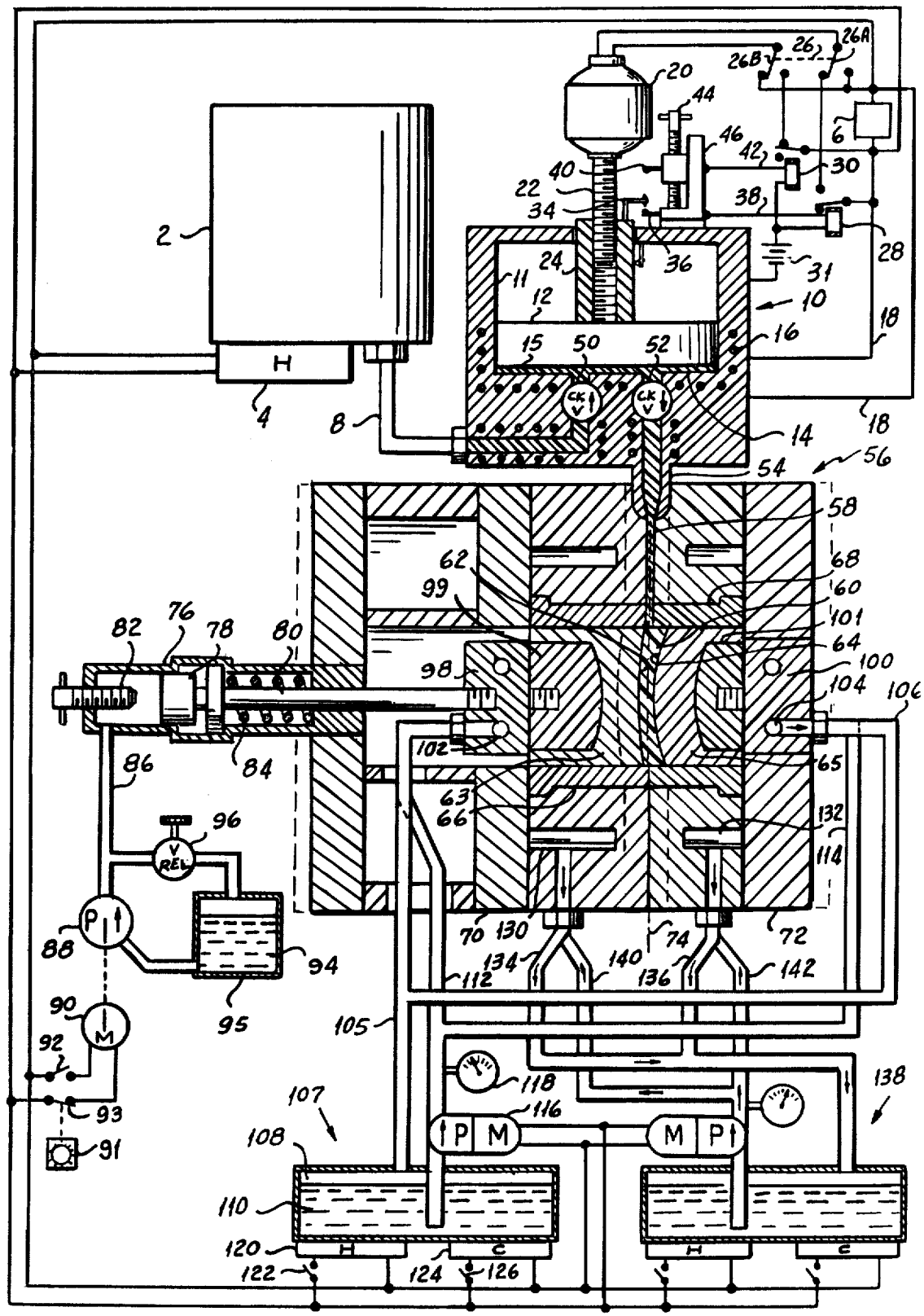
FIG. 3 is an elevational view of a preferred embodiment of an apparatus suitable for practicing our invention.

Referring to FIG. 3, one form of our apparatus suitable for carrying out our method includes a resin melting tank 2 heated by heater 4, supplied with power from a supply 6. Melted resin, such as polycarbonate resin from tank 2 passes through a tube 8 to a measuring device, which is indicated generally by the reference character 10. We mount a piston 12 for movement within a cylinder 11 to draw a measured charge 15 of viscous resin into the space 14 below the piston. Heating coil 16 provided with power from supply 6 through lines 18 heats the device 10 to a temperature which maintains charge 15 at sufficiently high temperature that its viscosity will be relatively low. A motor 20 is mounted above cylinder 11 to rotate a screw 22 which is threaded into the bore of piston rod 24, so that the rotation of motor raises or lowers piston 12. In order to insure this result, we form rod 24 with a non-circular cross section and provide the cylinder opening through which the rod passes with such a shape as to prevent rotation of the rod with screw 22. A switch including a pair of contact arms 26A and 26B ganged as indicated at 26 is adapted to be moved between a first position in which motor 20 is energized to raise piston 12 and a second position at which the motor 20 is energized to lower the piston 12.

One terminal of power supply 6 is connected directly to the "down" pole of arm 26B and to the "up" pole of arm 26A. We employ respective normally open relays 28 and 30 to connect the other terminal of the supply to the other poles of switch 26. The operation of relays 28 and 30 is controlled by a battery 31 connected between the conductive body of cylinder 11 and one terminal of each of the relay windings and by a movable limit switch contact 34 on the conductive rod 24 and associated with a fixed lower limit contact 36 and an adjustable upper limit contact 40. Respective lines 38 and 42 connect contacts 36 and 40 to the other terminals of the relay windings 28 and 30. Bracket 46 insulates the contacts 36 and 40 from each other. Screw 44 facilitates the adjustment of contact 40 with relation to contact 36 to determine the charge of resin to be introduced into the mold in a manner to be described.

From the structure just described it will be apparent that, with switch 26 set to drive piston 12 down, energy will be supplied to motor 20 through switch arm 26B directly to one terminal of source 6 and through arm 26A and relay 28 to the other terminal of the source. When the piston reaches its lower limit contact 34 engages contact 36 to energize the winding of relay 28 to stop motor 20. When switch 26 is reversed the motor moves piston 12 up until contact 34 engages contact 40 to energize the winding of relay 30. This accurately controls the total amount of travel of piston 12 and therefore allows the difference between the maximum and minimum volume of measuring chamber 14, which is the volume measured by measuring device 10.

A first check valve 50 allows melted plastic to flow into measuring chamber 14 when piston 12 is being lifted upward, but prevents any melted plastic from being forced out through tube 8 into melting tank 2 when piston 12 is being lowered. Similarly, a second check valve 52 allows melted plastic to be forced out of a nozzle 54 when piston 12 is being lowered, but does not allow plastic to be drawn from nozzle 54 into chamber 14 when piston 12 is being raised.

We position the outlet nozzle 54 of the device 10 to register with the sprue runner 58 of a mold assembly, indicated generally by the reference character 56, when the mold members 70 and 72 are moved to closed positions along a parting line 74. In this position of the mold members, material injected into runner 58 flows into the space 60 between respective mold inserts 63 and 65, the faces of which have been ground to provide the optical surfaces necessary to form the finished lens. The shapes of optical surfaces 62 and 64 are used to impart the proper curvature required for a given ophthalmic prescription of the lens which is to be molded within cavity 60. Different optical inserts can be used to replace optical inserts 63 and 65 so as to change the prescription of a given lens produced within cavity 60. As will more fully be explained hereinbelow, at least one of the inserts 63 and 65 is movable relative to its associated mold member. In the particular arrangement illustrated in FIG. 3, we movably mount insert 63 in a sleeve 66 carried by mold member 70. Preferably, we form sleeve 66 from a hard metal to withstand the wear incident to movement of the insert. While insert 65 does not move in the embodiment illustrated, we also mount insert 65 in a sleeve 68 carried by mold member 72. As is known in the art, any suitable means (not shown) can be provided for moving mold members 70 and 72 apart to approximately the broken line position in FIG. 3 and for holding the members together along line 74 under pressure in the course of a molding operation.

We mount a hydraulic cylinder 76 on block 70. A piston 78 in cylinder 76 has a rod 80 connected to a heat transfer block 98 which carries insert 63 for movement therewith. A spring 84 urges piston 78 into engagement with a stop screw 82. A switch 92 is adapted to be closed to energize a motor 90 to drive a pump 88 to supply hydraulic fluid 94 from a reservoir 95 to a line 86 leading into cylinder 76. As the amount of fluid 94 which is pumped into cylinder 76 increases, piston 78 pushes insert 63 to the right as viewed in FIG. 3. A variable pressure relief valve 96 can be adjusted to limit the pressure generated by pump 88 and thus to control the pressure exerted upon piston 78.

We place in insert 63 a plug 99 which is made of a material of lower thermal conductivity than that of the rest of insert 63. The purpose of this conducting plug is to withdraw heat less rapidly from the central portions of optical surface 62 than from its peripheral surfaces, where, as in the example shown, the lens being formed is thinner in the center than at other edges. This heat is transferred away from the center of optical surface 62 through conducting plug 99 to heat transfer block 98. Similarly, mold block 72 contains a heat transfer block 100 which is attached to that mold block and which contains a threaded stud on which optical insert 65 can be attached. A plug 101 within optical insert 65 is made of a material of lower thermal conductivity than the remainder of optical insert 65. Plug 101 causes heat transfer to take place at a lower rate between the central portions of optical surface 64 and heat transfer block 100 than it does between the peripheral portions of that optical surface and that heat transfer block. Heat transfer blocks 98 and 100 each contain heat transfer passageways 102 and 104, respectively, which are connected to heat transfer fluid drain lines 105 and 106, respectively.

Lines 105 and 106 are connected to a heat transfer recycling system, indicated generally by reference numeral 107. The heat transfer recycling system is made up of a reservoir 108 for containing a heat transfer fluid 110. This heat transfer fluid could be steam, water, or some other fluid, depending upon the particular temperature and rates of heating and cooling which are desired to be obtained through the use of the transfer system. Heat transfer fluid 110 enters heat transfer block 98 through entrance line 112, and heat transfer block 100 through entrance line 114. Heat transfer fluid 110 is pumped through entrance lines 112 and 114 by a pump-motor combination 116. A thermometer 118 is placed on the output of pump-motor 116 to enable an operator to determine the temperature of fluid 110 which is being fed into cooling blocks 98 and 100. Reservoir 108 has a heater 120 with a switch 122 and a cooler 124 with a switch 126. For most applications cooler 124 could be comprised of a fan placed so as to direct air flow upon radiative cooling surfaces of reservoir 108.

By opening and closing switches 122 and 126 at various times and observing the temperature on thermometer 118, an operator can control the amount of heat which is either introduced into or withdrawn from heat transfer blocks 98 and 100 and inserts 63 and 65 to which they are attached. In a similar manner, heat can be supplied or withdrawn from cylinder sleeves 66 and 68, which also form part of the surface of mold cavity 60, by means of heat transfer passageways 130 and 132. These passageways are connected by heat transfer exit lines 134 and 136, respectively, to a heat transfer recycling system shown generally by reference numeral 138. Heat transfer recycling system 138 is virtually identical to heat transfer recycling system 107, containing a reservoir of heat transfer fluid, a pump-motor combination, a thermometer, and a heater and a cooler which can each be controlled by switches. As a result, the heat transfer fluid which is pumped through heat transfer entrance lines 140 and 142 into passageways 130 and 132, respectively, can have its temperature controlled independently from the temperature of heat transfer fluid 110 which is pumped into passageways 102 and 104. Therefore, it is possible to control the temperature of cylinder sleeves 66 and 68 somewhat independently of the temperature of optical inserts 63 and 65.

Referring now to FIGS. 1 to 3 in practicing our method of making ophthalmic lenses, the optical inserts 63 and 65 required to produce the desired lens are assembled in the two mold members 70 and 72. It will readily be appreciated that the heat transfer characteristic and the configuration of the bodies 99 and 101 are dictated by the lens being formed.

Before the actual molding operation is begun the volume of material at the temperature of injection should be precisely calculated taking into account the volume of the outlet passage from valve 52 and that of the runner 58. This can readily be done from the known shrinkage property of the material. When this calculation has been made, stop 40 is set so that the apparatus 10 delivers the desired quantity when piston 12 moves downwardly.

As shown roughly in FIG. 2, polycarbonate exhibits a significantly greater coefficient of expansion, or, conversely, rate of shrinkage, above its glass transition temperature, of about 305° F. than it does down below this temperature. Above the glass transition temperature, with shrinkage during cooling in the viscous state, the resultant change in volume occurs in a random and unpredictable manner, while below this temperature the shrinkage which occurs is linear and predictable. As will be explained more fully hereinbelow, we apply coining pressure to the mass as it cools to the glass transition temperature and relieve this pressure when the body has reached that temperature.

In practicing our process, the sleeves 66 and 68 are heated to a temperature slightly below the glass transition temperature, or to a temperature of about 285° F. in the case of polycarbonate. This is readily achieved by the system 107. The mold members 70 and 72 are brought together with the inserts 63 and 65 in their relatively adjacent positions under the action of fluid under pressure supplied by pump 88. Next, that pressure is relieved so as to permit the inserts 63 and 65 to move to relatively remote positions under the action of spring 84 to open cavity 60 to a volume greater than that of the finished lens.

With mold cavity 60 open, measuring device 10 is used to meter a proper amount of molten plastic and to inject it into mold cavity 60. This is done by first switching gang switch 26 to the down position. As we previously described, this causes piston 12 to move down until contact 34 hits contact 36. Once piston 12 has been moved as far down as is allowed by contact 34, gang switch 26 should then be turned to the up position, causing piston 12 to be lifted up, increasing the volume of measuring chamber 14. The molten plastic within melting tank 2 is placed above the level of measuring chamber 14 so that its weight will push such plastic through tube 8 and check valve 50 causing the volume of measuring chamber 14 to be filled. This process continues until contact 34 hits contact 40, which stops any further increase in the volume of measuring chamber 14. As a result, chamber 14 has been filled with a measured volume of molten plastic.

Once this measured volume of molten plastic has been loaded into chamber 14, switch 26 can again be switched to the down position. This causes piston 12 to be pushed down until contact 34 hits contact 36. As a result, the measured mass of molten plastic will be injected through check valve 52, nozzle 54 and passage 58 into mold cavity 60. This volume of heated viscous resin thus injected provides the amount of material necessary to form the finished lens. The injection pressure employed in our method is appreciably lower than in conventional injection molding techniques since, as will be apparent, we do not rely on the pressure of injection to shape the injected material.

This process of measuring and injecting molten plastic operates best if the plastic is heated to a fairly low viscosity at the time of its measurement and injection. In the case of polycarbonate, it is suggested that the plastic be measured and injected at a temperature of approximately 550° F. It is also suggested that measuring chamber 14 be kept at a constant temperature by heating coil 16 so that the mass of plastic measured for a given setting of contact 40 remains constant.

As soon as the measured mass of molten plastic has been injected into mold cavity 60, switch 92 should be closed turning on motor 90 and starting the operation of pump 88. Hydraulic pressure will be introduced into hydraulic cylinder 76, thus exerting a force against the head of piston 78, which in turn causes rod 80 to push cooling block 98 and optical insert 63 into cavity 60. As a result, any air which might be left remaining in mold cavity 60 after the injection of plastic is squeezed out, and insert 63 rapidly advances toward insert 65 to coin the injected mass of molten plastic and completely to fill the mold cavity 60. As the viscous mass cools under pressure heat is conducted away by the various parts of mold 56. In the course of this cooling the body shrinks and the pressure on insert 63 cause the body to remain in contact over the entire extent of surfaces 62 and 64.

Not only do we apply pressure to the body during the time it is in a viscous state but also we ensure uniform cooling of all parts down to the glass transition point to avoid the defects inherent in permitting one part of the body to solidify before another part.

We control cooling of the mass by heat transfer passageways 102, 104, 130, and 132 and by conducting plugs 99 and 101. By causing system 107 to withdraw heat more rapidly from optical inserts 63 to 65 than heat is withdrawn from cylinder sleeves 66 and 68 by system 138, it is possible to prevent premature solidification from occurring at the edges of mold cavity 60 adjacent to cylinder sleeves 66 and 68. Furthermore, by varying the shape of conducting plugs 99 and 101 within optical inserts 63 and 65, respectively, it is possible to control the rate at which heat is withdrawn from various portions of optical surfaces 62 and 64, so as to cause heat removal to take place at a higher rate near those portions of the surface of mold cavity 60 which are farther from the median surface of the lens which is being molded than those portions which are nearer that surface. As a result, solidification occurs along the various portions of the median surface of the lens which is being molded (approximately in the position of parting line 74) at substantially the same time. Thus, by controlling the rate at which heat is removed from various areas of the surface of mold cavity 60, it is possible to prevent solidification in any one portion of the injected plastic from obstructing the compressive motion of insert 63 until the entire injected plastic has solidified. As a result, optical insert 63, at any given moment, advances into mold cavity 60 until the liquid pressure within the molten part of the injected plastic, which is generated by and which is proportional to the compressive force applied to optical insert 63, generates an opposing force equal to that compressive force. This controlled removal of heat also prevents the unsolidified portion of the injected plastic from being divided by intervening solidification. As a result, the liquid pressure within the uncongealed portion of the injected plastic is uniform, and all portions of the injected plastic set under the pressure controlled by the compressive force applied to optical insert 63. Because of this controlled removal of heat, any shrinkage resulting from the cooling of such molten plastic is compensated for by the advance of optical insert 63 into molding cavity 60 and surfaces of the injected plastic remain in contact with optical surfaces 62 and 64 until its entire mass is substantially solidified.

Once the entire injected mass within molding cavity 60 has been allowed to solidify, further shrinkage caused by cooling will take place at a virtually uniform rate and thus will not result in optical distortion. Thus, once such solidification has taken place, switch 92 can be opened so as to turn motor 90 and pump 88 off. We may achieve this operation automatically by calculating or empirically determining by the use of a thermocouple at a suitable location in the mold assembly the length of time following injection required for a particular lens to reach a temperature slightly below its glass transition temperature. With this time known, a timer 91 can be set at the time of injection to open a normally closed switch 93 in the circuit of motor 90. Timer 91 may be of the type which automatically resets. As the pressure upon the lens within mold cavity 60 is gradually reduced, spring 84 retracts optical insert 63. During this time, the lens cools further and it shrinks away from the surfaces of mold cavity 60. When the injected plastic has been allowed to cool to approximately 285°, mold 56 can be opened along parting line 74 and the lens and the sprue which have formed in mold cavity 60 and passageway 58 can be removed from mold 56 by methods known to the art of molding. The sprue can be removed by any suitable means known to the art.

While our method and apparatus are particularly suited to the formation of high minus lenses, they can be used for molding optical lenses of different optical characteristics merely by changing the inserts 63 and 65 and the plugs 99 and 101 so as to give the required shape and provide uniform cooling. To produce a lens with a given pair of optical inserts of a given thickness, one need merely produce a series of lenses while varying the setting of contact 40 by means of screw 44 in accordance with the parison mass required to form the lens. Once a setting of contact 40 has been found which produces a lens of the desired thickness, that setting may be repeatedly used by measuring device 10 to inject the necessary amount of plastic into optical cavity 60 to produce a lens of the desired thickness. Experimentation with our invention has shown that lenses with a central thickness of 3 mms can be repeatedly produced by this method with a variation of less than five-thousandths of an inch from the desired central thickness of 3 mms.

We have found that pressure applied upon optical insert 63 during the molding process should be varied depending upon the variation of thickness between the thickest and the thinnest part of the lenses to be produced. For lenses which are fairly flat pressures in the range of 100 to 150 lbs. per square inch are adequate.

For lenses with more extreme variations, such as that encountered in +4 diopter lenses, pressures in the range of 250 to 300 lbs. per square inch are required. Lenses with even greater variations between the thickest and the thinnest regions may require pressures of 800 lbs. per square inch or more.

It will be obvious to one skilled in the art that variations in the specific heat, as well as the thermal conductivity, of various portions of the mold could be used to control the rate of cooling so as to prevent solidification which would block the application of compressive pressure evenly to all parts of the injected plastic which are unsolidified at any moment during molding. Further, it will be obvious that in some situations it will not be necessary to have two separate heat transfer systems, one for cooling the optical inserts and one for cooling the cylinder sleeves, as is shown in the illustrated embodiment.

We have used a piston pump which produces a fluctuating hydraulic pressure with this apparatus and we have found it to produce good results, but it will be obvious to one skilled in the art that a continuous pressure hydraulic pump would work as well. Moreover, we may use two movable optical inserts instead of one, with each being movable by a hydraulic cylinder or some other means of applying pressure.

It will be seen that we have accomplished the objects of our invention. We have provided an apparatus and a method for molding articles of high precision and quality, such as ophthalmic lenses, from molten materials. Our method and apparatus are especially suited for the molding of such articles from plastics such as polycarbonate. We do not require overflow of material from the mold cavity in the course of the injecting operation. Our method permits of injection of the molding material at relatively low pressures as compared with injection pressure employed in the prior art. Our method does not require as much molding material to be used in each molding operation as is required in methods of the prior art. Our method and apparatus enable us to form high minus lenses without weld lines.

It will be understood that certain features and subcombination are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A method of forming a lens of thermoplastic resin by injection including the steps of first forming a mold space having a movable surface portion conforming to the shape of the finished lens, then injecting into said space a measured charge of plasticized thermoplastic resin equal to the amount required to form the finished lens, said mold space having a volume greater than that of said injected charge, then moving said surface portion in such a direction while confining said injected resin to said space as to reduce the volume of said mold space and apply pressure to said charge, cooling said mass while applying said pressure thereto, and removing said pressure when the charge reaches the glass transition temperature of said resin.

2. A method of forming a lens of thermoplastic resin by injection including the steps of first forming a mold space having a movable surface portion conforming to the shape of the finished lens, then injecting into said space a measured charge of plasticized thermoplastic resin equal to the amount required to form the finished lens, said mold space having a volume greater than that of said injected charge, then moving said surface portion in such a direction while confining said injected resin to said space as to reduce the volume of said mold space and apply pressure to said charge, and cooling said mass while applying said pressure thereto.

3. A method of forming an ophthalmic lens of thermoplastic resin in a mold having a pair of mold members relatively movable between an open position and a closed position, said members being provided with respective inserts movable relative to each other with said members in said closed position between a relatively adjacent postiion in which said inserts cooperate with said mold members to form a mold cavity having a configuration corresponding to that of the finished lens and a relatively remote position in which said inserts cooperate with said mold members to form an enlarged mold cavity having a volume greater than that of the finished lens, said mold members and said inserts being so constructed as to confine a charge of injected resin to said mold cavity with said members in said closed position, said method including the steps of moving said mold members to said closed position, moving said inserts to said relatively remote position with said mold members in closed position to form an enlarged mold cavity, accumulating a charge of hot viscous resin equal to the amount required to form the finished lens, injecting said accumulated charge into said enlarged cavity, moving said inserts toward said relatively adjacent position to apply pressure to said injected charge while confining said charge to said cavity, and cooling said charge while applying pressure thereto.

4. A method of forming an ophthalmic lens of thermoplastic resin including the steps of forming a mold space having a movable surface portion conforming to the shape of the finished lens, accumulating a charge of plasticized thermoplastic resin equal to the amount required to form the finished lens, said mold space having a volume greater than that of said accumulated charge, injecting said accumulated charge into said mold space, then moving said surface portion in such a direction while confining said injected charge to said space as to reduce the volume of said mold space and apply pressure to said charge, and cooling said mass while applying said pressure thereto.

5. A method of forming a lens of thermoplastic resin by injection in a mold having a pair of mold members relatively movable between an open position and a closed position, said members being provided with respective inserts movable relative to each other with said members in closed position between a relatively adjacent position in which said inserts cooperate with said mold members to form a mold cavity having a configuration corresponding to that of the finished lens and a relatively remote position in which said inserts cooperate with said mold members to form an enlarged mold cavity, said mold members and said inserts being so constructed as to confine a charge of injected resin to said mold cavity with said members in said closed position, said method including the steps of moving said mold members to said closed position, moving said inserts to said relatively remote position with said mold members in closed position to form an enlarged mold cavity, then injecting into said enlarged mold cavity a measured charge of plasticized thermoplastic resin equal to the amount required to form the finished lens, said enlarged mold cavity having a volume greater than that of said injected charge, then moving said inserts toward said relatively adjacent position to apply pressure to said charge while confining said injected resin to said cavity, and cooling said charge while applying pressure thereto.

6. A method of forming a high minus lens from polycarbonate resin in a mold having a pair of mold members relatively movable between an open position and a closed position, said members being provided with respective inserts movable relative to each other with said members in said closed position between a relatively adjacent position in which said inserts cooperate with said mold members to form a mold cavity having a configuration conforming to that of the finished lens and a relatively remote position in which said inserts cooperate with said mold members to form an enlarged mold cavity having a volume greater than that of the finished lens, said mold members and said inserts being so constructed as to confine a charge of injected resin to said mold cavity with said members in said closed position, said method including the steps of heating said inserts to a temperature slightly lower than the glass transition temperature of polycarbonate, moving said members to said closed position, moving said inserts to said relatively remote position to form an enlarged mold cavity, heating a supply of polycarbonate to a viscous state, injecting into said enlarged mold cavity a measured charge of hot viscous polycarbonate equal to the amount required to form the finished lens, moving said inserts toward said relatively adjacent position to apply pressure to said charge while confining said injected resin to said cavity, cooling said charge while applying pressure thereto, said cooling step comprising removing heat from said charge at a greater rate at the edges of said lens than at the center thereof, relieving said pressure when said charge is at a temperature slightly below its glass transition temperature, further cooling said charge to produce said lens, opening said mold, and removing said lens.

7. A method of forming a lens from resin in a mold having a pair of mold members relatively movable between an open position and a closed position, said members being provided with respective inserts movable relative to each other with said members in said closed position between a relatively adjacent position in which said inserts cooperate with said mold members to form a mold cavity having a configuration conforming to that of the finished lens and a relatively remote position in which said inserts cooperate with said mold members to form an enlarged mold cavity having a volume greater than that of the finished lens, said mold members and said inserts being so constructed as to confine a charge of injected resin to said mold cavity with said members in said closed position, said method including the steps of heating said inserts to a temperature slightly lower than the glass transition temperature of said resin, moving said members to said closed position, moving said inserts to said relatively remote position to form an enlarged mold cavity, heating a supply of said resin to a viscous state, injecting into said enlarged mold cavity a measured charge of hot viscous resin equal to the amount required to form the finished lens, moving said inserts toward said relatively adjacent position to apply pressure to said charge while confining said injected resin to said cavity, cooling said charge while applying pressure thereto, said cooling step comprising removing heat from said charge at different rates at different points over the surface of said lens, relieving said pressure when said charge is at a temperature slightly below its glass transition temperature, further cooling said charge to produce said lens, opening said mold, and removing said lens.

8. A method of forming a lens from resin in a mold having a pair of mold members relatively movable between an open position and a closed position, said members being provided with respective inserts movable relative to each other with said members in said closed position between a relatively adjacent position in which said inserts cooperate with said mold members to form a mold cavity having a configuration conforming to that of the finished lens and a relatively remote position in which said inserts cooperate with said mold members to form an enlarged mold cavity having a volume greater than that of the finished lens, said mold members and said inserts being so constructed as to confine a charge of injected resin to said mold cavity with said members in said closed position, said method including the steps of heating said inserts to a temperature slightly lower than the glass transition temperature of said resin, moving said members to said closed position, moving said inserts to said relatively remote position to form an enlarged mold cavity, heating a supply of said resin to a viscous state, injecting into said enlarged mold cavity a measured charge of hot viscous resin equal to the mount required to form the finished lens, moving said inserts toward said relatively adjacent position to apply pressure to said charge while confining said injected resin to said cavity, cooling said charge while applying pressure thereto, relieving said pressure when said charge is at a temperature slightly below its glass transition temperature, further cooling said charge to produce said lens, opening said mold, and removing said lens.

9. A method of forming a lens of synthetic resin in a mold having a pair of mold members relatively movable between an open position and a closed position, said members being provided with respective inserts movable relative to each other with said members in said closed position between a relatively adjacent position in which said inserts cooperate with said mold members to form a mold cavity having a configuration corresponding to that of the finished lens and a relatively remote position in which said inserts cooperate with said mold members to form an enlarged mold cavity having a volume greater than that of the finished lens, said mold members and said inserts being so constructed as to confine a charge of injected resin to said mold cavity with said members in said closed position, said method including the steps of moving said mold members to said closed position, moving said inserts to said relatively remote position with said mold members in said closed position to form an enlarged mold cavity, then injecting into said enlarged mold cavity a measured charge of hot viscous resin equal to the amount required to form the finished lens, then moving said inserts toward said relatively adjacent position to apply pressure to said charge while confining said injected resin to said cavity, cooling said charge while applying pressure thereto, and continuing the application of said pressure at least until said charge reaches the glass transition temperature of said resin.

10. A method of forming a lens of synthetic resin in a mold having a pair of mold members relatively movable between an open position and a closed position, said members being provided with respective inserts movable relative to each other with said members in closed position between a relatively adjacent position in which said inserts cooperate with said mold members to form a mold cavity having a configuration corresponding to that of the finished lens and a relatively remote position in which said inserts cooperate with said mold members to form an enlarged mold cavity having a volume greater than that of the finished lens, said mold members and said inserts being so constructed as to confine a charge of injected resin to said mold cavity with said members in said closed position, said method including the steps of moving said mold members to said closed position, moving said inserts to said relatively remote position with said mold members in closed position to form an enlarged mold cavity, then injecting into said enlarged mold cavity a measured charge of hot viscous resin equal to the amount required to form the finished lens, then moving said inserts toward said relatively adjacent position to apply pressure to said charge while confining said injected resin to said cavity, and cooling said charge while applying pressure thereto.

* * * * *